United States Patent [19]

Farnam

[11] 4,395,441
[45] Jul. 26, 1983

[54] METHOD OF COATING LIQUID PENETRABLE ARTICLES WITH POLYMERIC DISPERSIONS

[76] Inventor: Robert G. Farnam, 1230 N. Western Ave., Lake Forest, Ill. 60045

[21] Appl. No.: 285,860

[22] Filed: Jul. 22, 1981

Related U.S. Application Data

[63] Continuation of Ser. No. 14,991, Feb. 26, 1979, abandoned, which is a continuation-in-part of Ser. No. 933,893, Aug. 15, 1978, abandoned.

[51] Int. Cl.³ .............................................. B05D 3/06
[52] U.S. Cl. .................................... 427/211; 427/209; 427/290; 427/292; 427/314; 427/316
[58] Field of Search ............... 427/314, 316, 209, 211, 427/290, 315, 292

[56] References Cited

U.S. PATENT DOCUMENTS

| | | | |
|---|---|---|---|
| 2,627,482 | 2/1953 | Martin et al. | 427/314 X |
| 2,665,221 | 1/1954 | Grangaard | 427/316 |
| 2,889,806 | 6/1959 | Conant | 118/66 X |
| 3,526,207 | 9/1970 | Nadelson | 118/500 |
| 3,632,383 | 1/1972 | Dominick et al. | 427/316 X |

FOREIGN PATENT DOCUMENTS

| | | | |
|---|---|---|---|
| 1017484 | 1/1966 | United Kingdom | 427/314 |
| 1351084 | 4/1974 | United Kingdom | 427/211 |

*Primary Examiner*—Evan K. Lawrence
*Attorney, Agent, or Firm*—Mason, Kolehmainen, Rathburn & Wyss

[57] ABSTRACT

A liquid penetrable material such as a compactible gasket material is coated with a liquid dispersion of polymer or polymers, by first preheating the liquid penetrable material to a temperature sufficient to prevent any substantial penetration of liquid into the material when the material at the preheated temperature is coated with the liquid dispersion of polymer or polymers. The preheated material is then coated with the liquid dispersion of polymer or polymers in an amount sufficient to form a fluid-impermeable barrier over the material and the coated material is supported on a plurality of support members through a drying section until the coating is in a tack-free condition. After drying the material to a tack-free condition, it is supported on a conveyor through a curing station to cure the coating. Thereafter the material is delivered by suitable conveyors to an inspection and packaging station, but may be passed en route through another coating station, this time to receive a suitable release coating. In a specific embodiment of the invention, the gasket is supported through the drying section on a plurality of continuous elastomeric cords.

38 Claims, 29 Drawing Figures

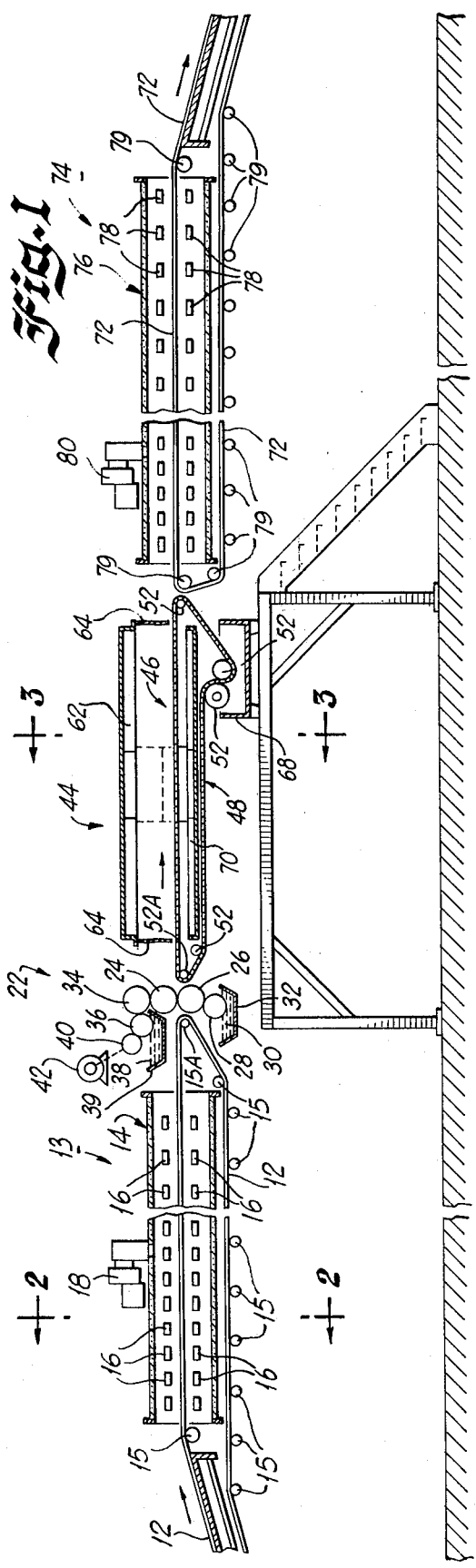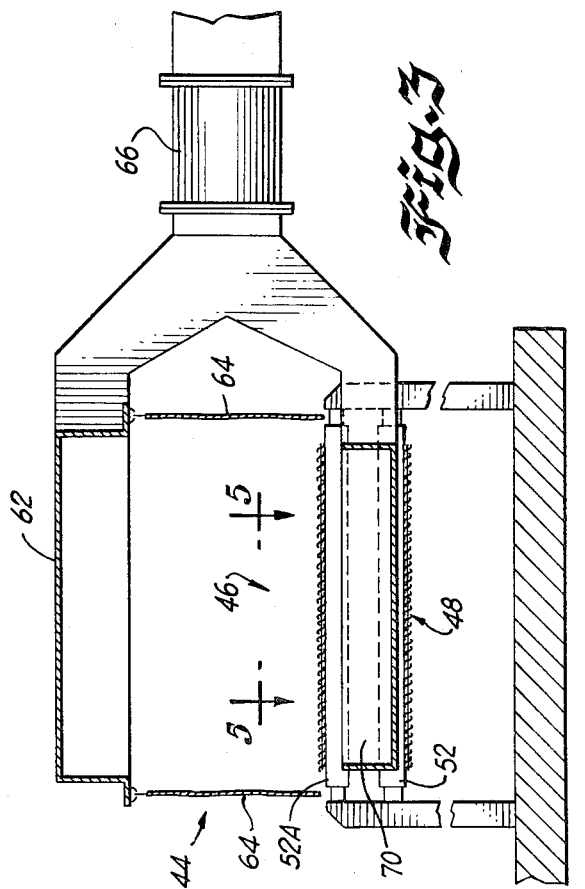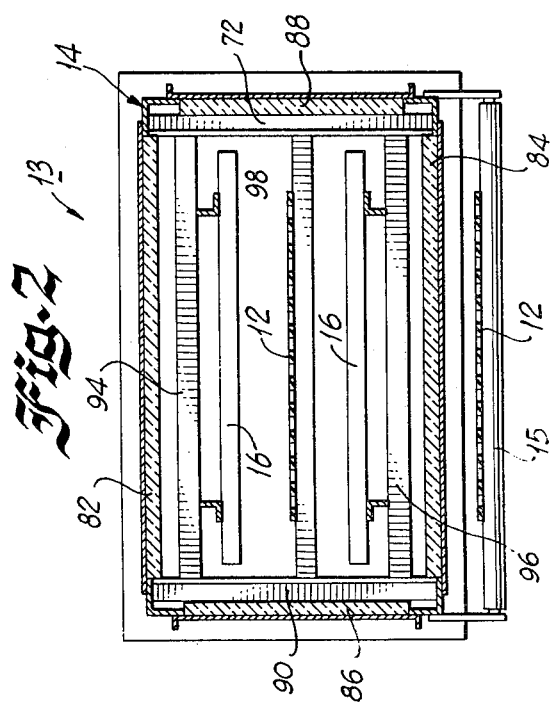

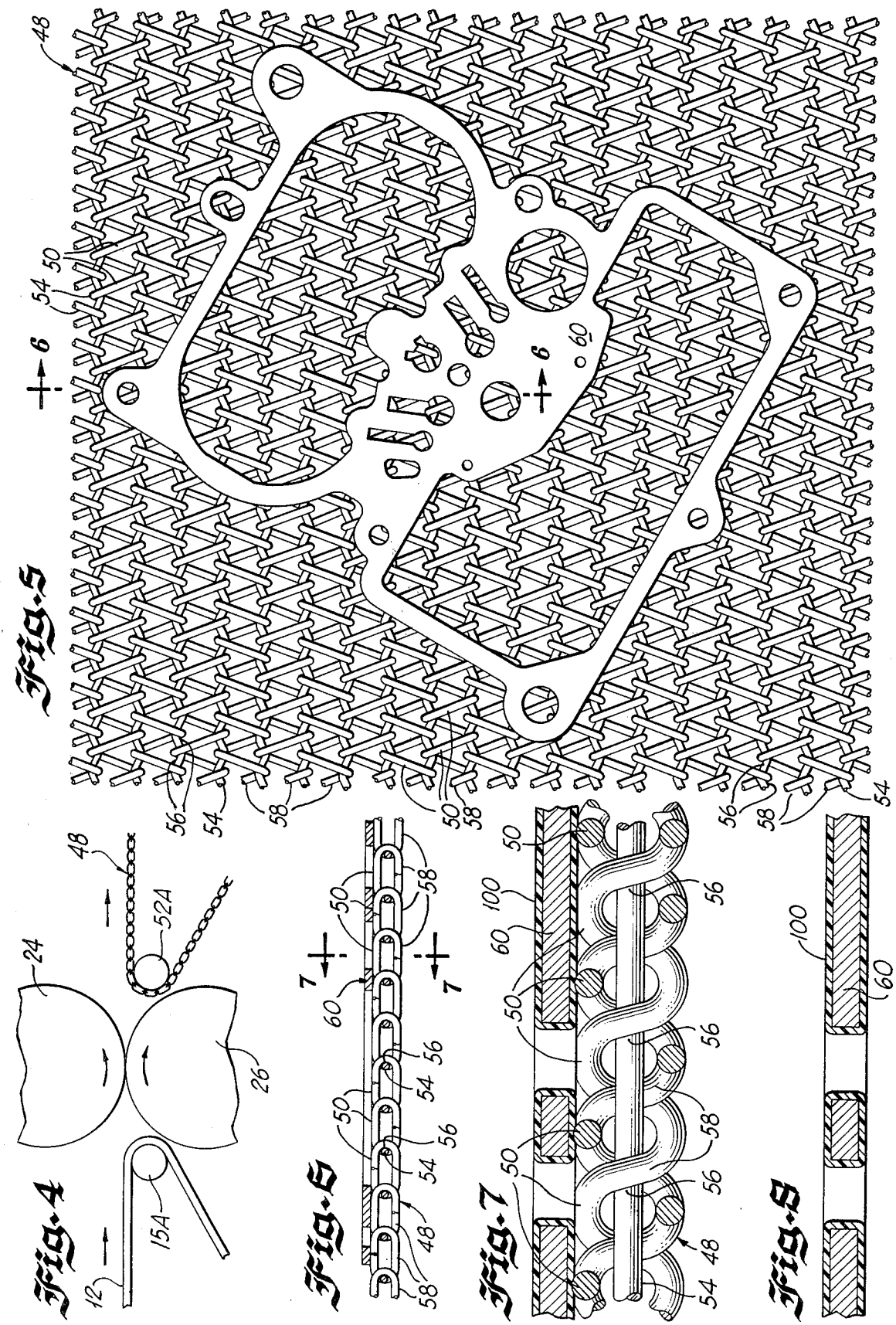

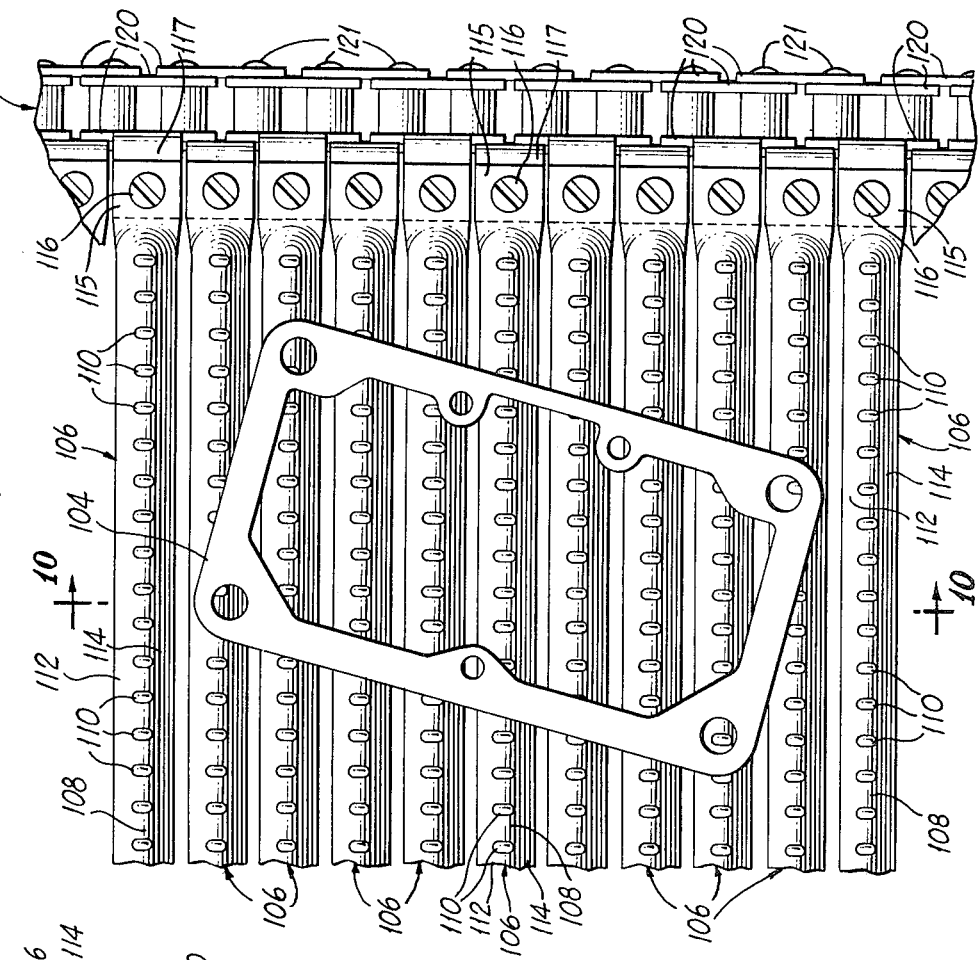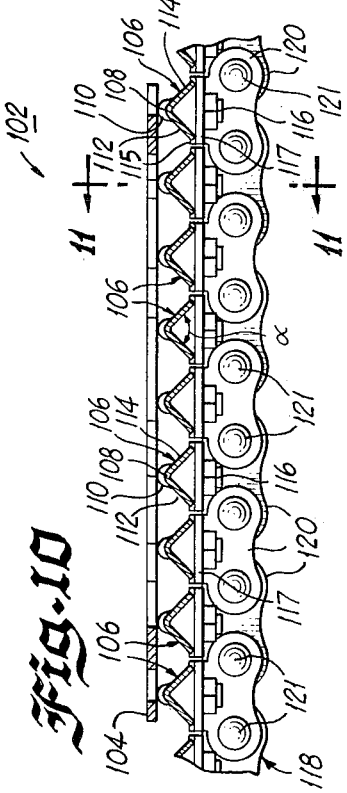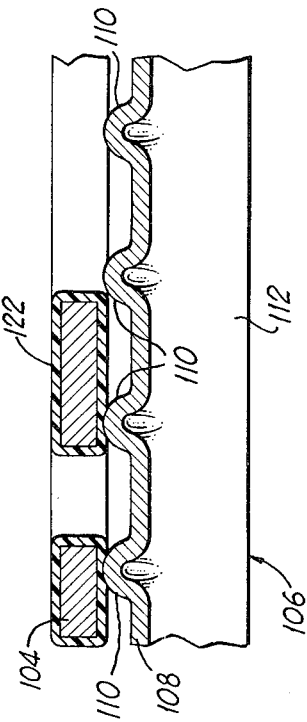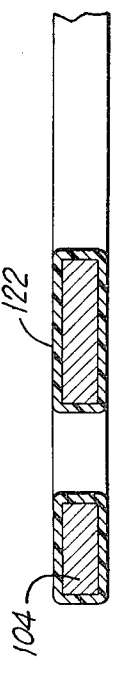

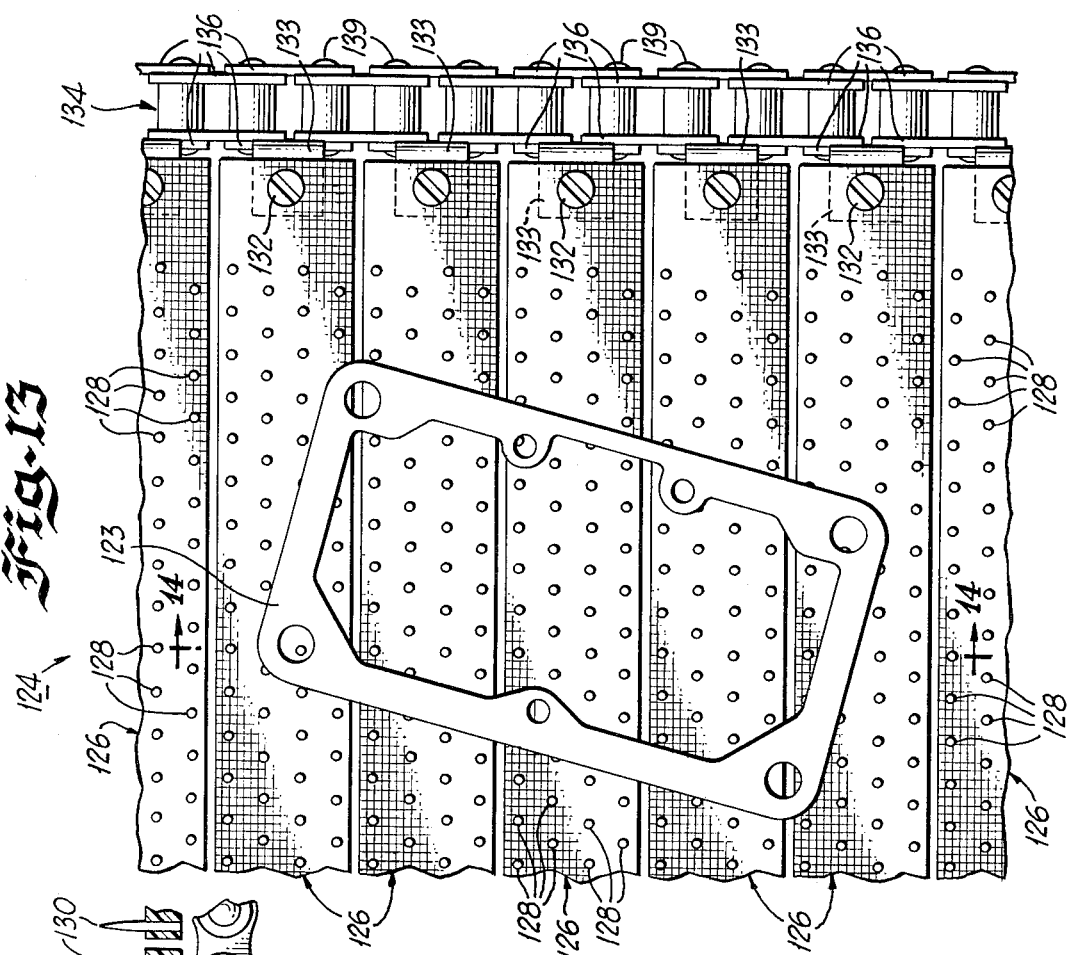
Fig. 13
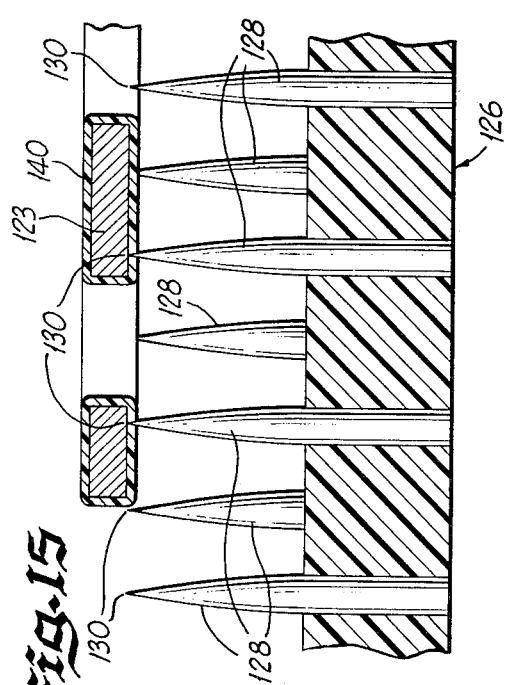
Fig. 14
Fig. 15
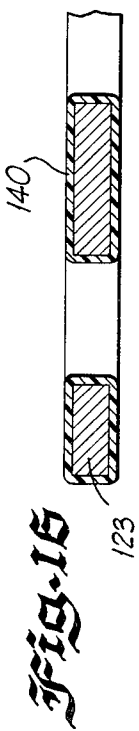
Fig. 16

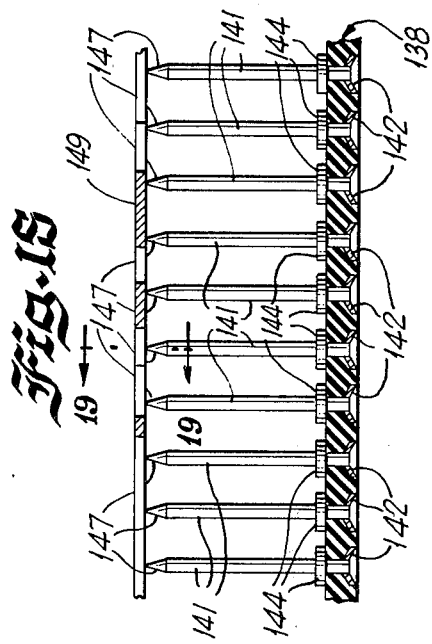
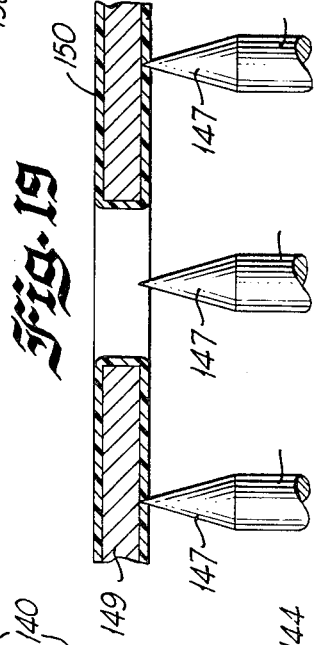
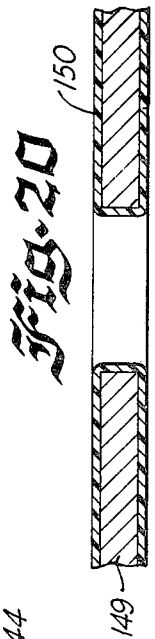
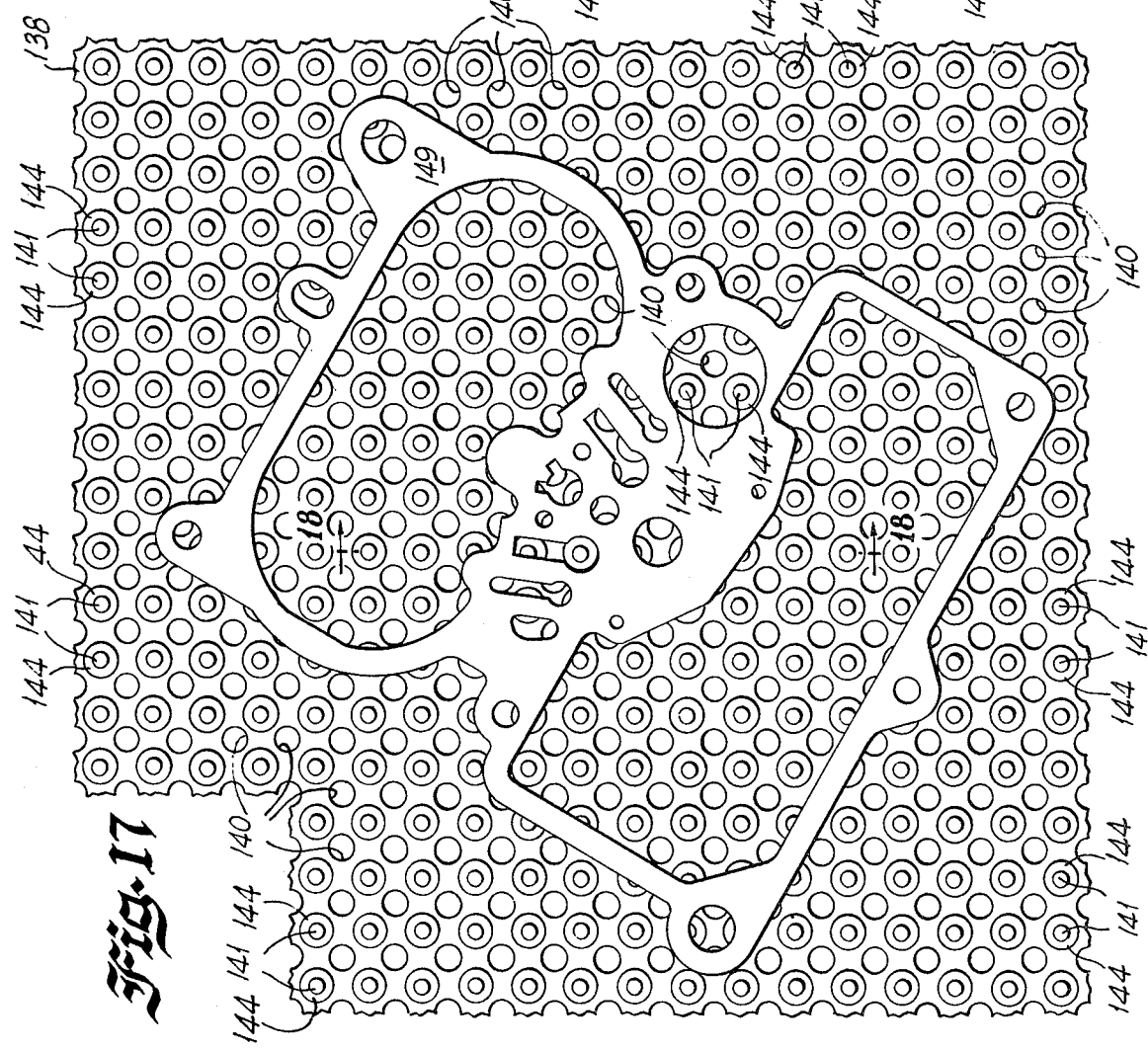

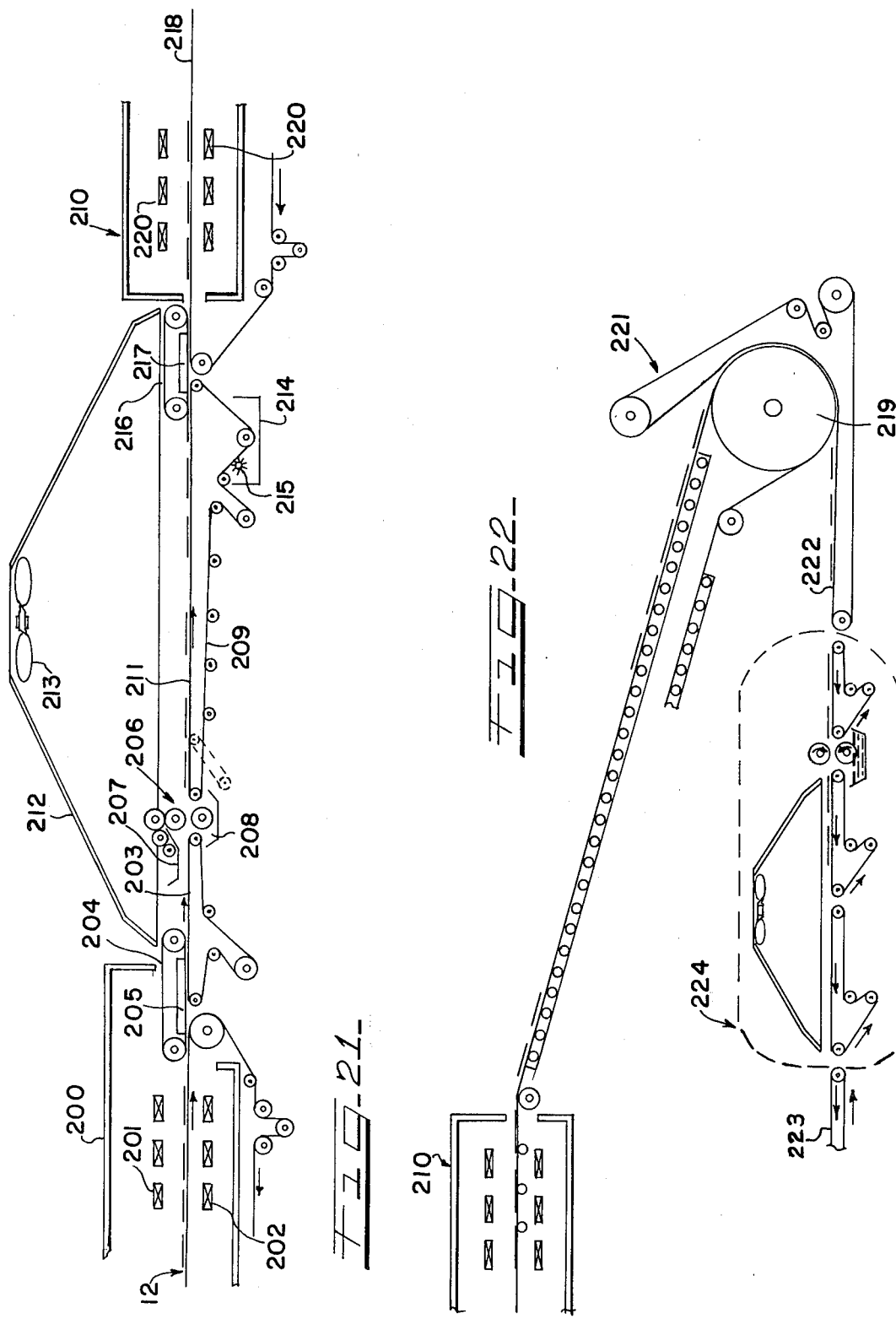

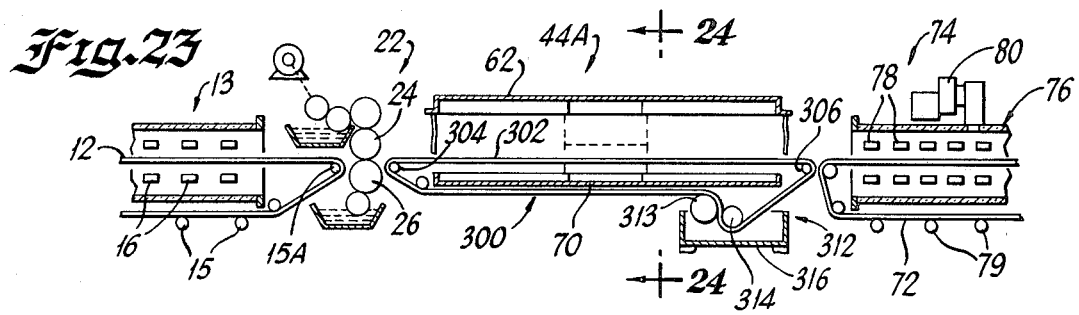
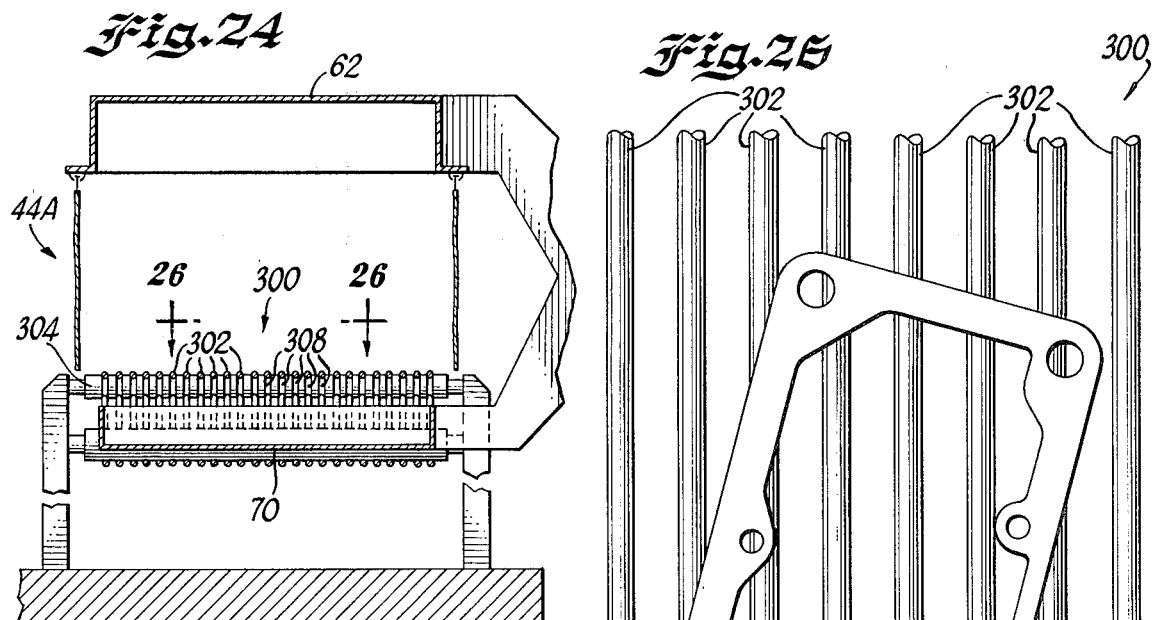
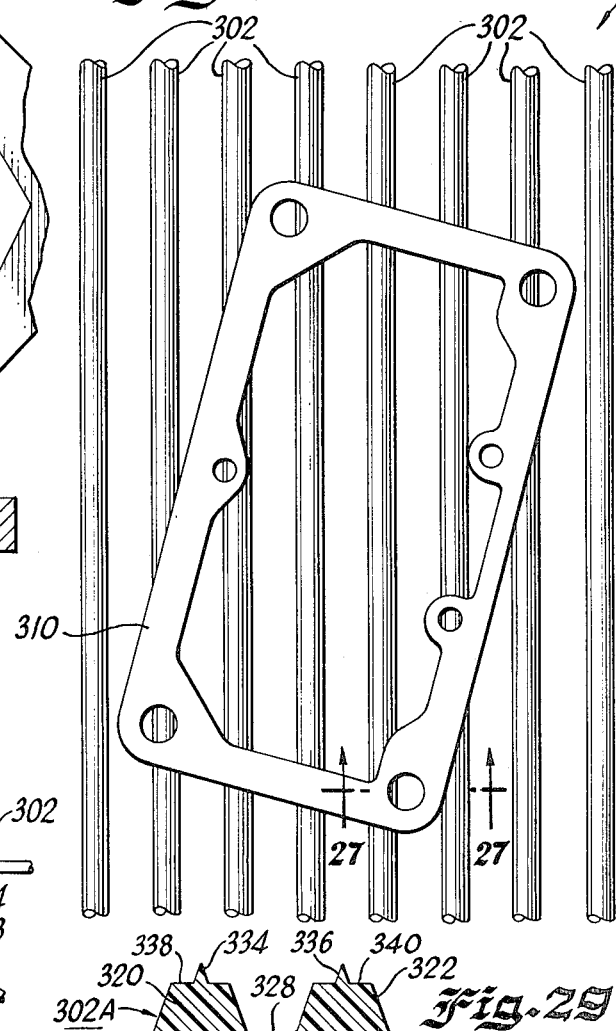
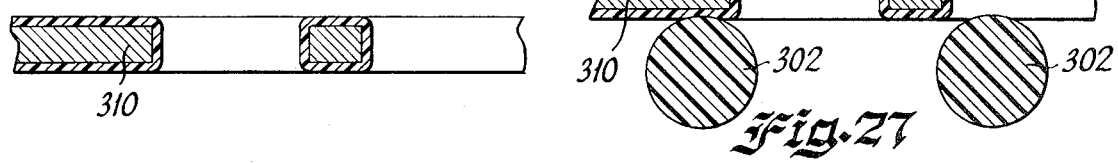

METHOD OF COATING LIQUID PENETRABLE ARTICLES WITH POLYMERIC DISPERSIONS

CROSS-REFERENCE TO RELATED APPLICATION

This is a continuation patent application of patent application Ser. No. 014,991, filed on Feb. 26, 1979, now abandoned, which is a continuation-in-part application of patent application Ser. No. 933,893, filed Aug. 15, 1978, now abandoned.

BACKGROUND OF THE INVENTION

1. Field of the Invention

The present invention relates to a method of coating fluid-penetrable articles with a polymeric disperson, preferably a water-dispersible polymeric coating, and includes the steps of pre-heating a fluid-penetrable article, such as a compactible gasket; thereafter coating the fluid-penetrable article with a polymeric disperson; conveying the coated article through a drying station on a plurality of support members, such as continuous elastomeric cords to allow the coated article to dry to a tack-free condition; and then conveying the coated article through a curing oven for curing the deposited coating material.

Many fluid-permeable compactible articles, such as gaskets, are coated with a polymeric dispersion, for example, a polymeric dispersion, such as chloroprene synthetic rubber blended with phenol formaldehyde resin or nitrile synthetic rubber blended with phenol formaldehyde resin. Articles, such as gaskets, with these type coatings, and after curing, provide fluid-impermeability during use. For example, an automotive transmission oil pan gasket requires a relatively thick uniform coating of a soft conformable material for sealing, principally due to the fact that the clamping flanges are relatively lightweight metal with rather wide spacings between the fasteners. The flanges are not only quite flexible, but in substantially all cases quite uneven. The clamp load on these type applications is very uneven—relatively high under the fasteners and relatively low between the fasteners, because the flanges bend readily between fasteners. The coating material provides the fluid barrier needed in the areas of the part that are lightly clamp loaded. The coatings selected are of course tailored to resist the environmental conditions such as the particular fluid, the temperatures, and the torque loading entailed with each application. The gasket material to be coated likewise is selected to provide the resistance to the environmental conditions in the particular application. In the case of a pan gasket, these gasket materials are commonly vegetable fibers blended with granulated cork and reinforced with elastomeric materials such as chloroprene rubber or nitrile rubber and in some cases SBR synthetic rubber. Frequently, mineral fibers are used—blended with vegetable fibers.

2. Prior Art

A variety of gasket materials have been coated with polymeric dispersions for many years. My prior U.S. Pat. No. 3,770,480 discloses this assignee's coating method used immediately prior to this invention for applying polymeric coatings to gasket materials. In general, a die cut gasket is coated on both major surfaces and its edges with a blend of synthetic elastomers and phenolic resin in a water or solvent dispersion. When in the form of a die cut part, the gasket includes one or more pilot holes so that it can be hung on a hook from the pilot hole for drying and then curing of the polymeric coating. In this manner the polymeric coating is not disturbed during drying or curing so that the coating material will maintain its fluid-impermeability. In this prior art method, the gaskets coated with a wet, tacky polymer are manually hung onto hooks from the pilot holes and are sent on a long, continuous path by a chain conveyor to provide sufficient time for the applied coating to be partially dryed prior to curing. The polymeric coating on the hung gaskets is dryed while the gaskets are hanging from the pilot hole until the polymeric coating is substantially tack-free. The dryed, coated gaskets are then conveyed through a curing station, while hung from the pilot holes, and since the major coated surfaces of the gaskets do not contact the conveyor, the impermeability of the coating is not disturbed during drying or curing. The above-noted drying step prior to curing is required for a very important reason—to permit a major portion of the fluid from the polymeric coating, which has partially penetrated the compactible material, to escape before the coating is subjected to the relatively high temperature curing (for example 325°–375° F.). The curing gasifies the fluid (for example water) during the curing step and, at the same time, seals the polymeric surface to render the coating impermeable. Any significant amount of fluid that has not escaped during the drying step becomes locked into the part, and will cause the polymeric coating to blister or 'balloon' outwards.

Drying by the above-described hook-hanging method is quite slow and requires very careful monitoring of the room or chamber conditions, particularly temperature and humidity, where the drying is accomplished. The drying operation can be speeded up using higher temperatures upwards to approximately 110°–130° F. but has to be very carefully controlled to be sure that the surface of the coating does not seal or "skin over" by premature curing to lock in fluid from the polymeric coating and thereby slow down the drying step rather than speed it up. Accordingly, drying must be carried out slowly at a temperature well below the curing temperature of the polymeric coating, generally room temperature. In actual practice, air drying at room temperatures in the range of 65°–100° F., which requires a range of 20–80 minutes, has been found to be safest and is typical for the above-described hook hanging drying procedure. Drying these type of coatings sometimes has to be stopped when the room humidity becomes too high until there is a weather change. Three or four warm days with, for example, 85° F. with 90% humidity, will cause a shutdown of the drying operation handling the above-described coated gasket materials.

The time and temperatures required for drying by the hook-hanging method are affected by the particular porosity of the many varieties of compactible gasket materials used. A gasket material will pick-up or absorb fluid from the applied polymeric coating in proportion to its porosity. It has been necessary to subject coated, die-cut gaskets to a substantial air-dry period in the range of about 20–80 minutes at 65°–100° F., after coating and before curing, to make sure that the water picked up by the gasket material from the polymeric coating has been driven off before the coating "skins over" on the surface. The coating materials are designed to be fluid-impermeable and if these coatings "skin over" or surface dry before the gasket-obtained water migrates out from the gasket sheet and through the polymeric coating, the retained water or solvent(s) will vaporize at the high temperatures in the curing stage causing blistering of the gasket.

Considerable skill has been developed in the air-drying/hook-hanging method so that blistering can be controlled by assuring that the hook-hung gaksets travel through a lengthy air drying path. Depending on the temperature and humidity conditions in the room in which the hook-hung parts are dried, sometimes warm, dry air is circulated to reduce the time necessary to drive off the water picked up by the gasket material. This air circulation technique must be controlled very carefully, however, since the coating material can be caused to "skin over" too quickly before the moisture from the gasket material has migrated out from the sheet as described above. In any event, each part must be individually hung on hooks of the conveyor while the conveyor moves through a large room at a temperature of 65°–100° F. and at varying relative humidity during the year.

In my prior U.S. Pat. No. 3,986,915, there is disclosed a method of fabricating a valve plate for transmissions including a metal core having a gasket material adhered to one or both core surfaces. The gasket material can be a polymeric material and the metal core can be preheated for cover sheet adherence and to reduce subsequent curing time of the adhesive. The gasket material, however, is applied to the metal core as solid sheet material in U.S. Pat. No. 3,986,915 and, since the metal core material is fluid-impermeable, fluid penetration into the core material is not a problem.

As set forth in my U.S. Pat. No. 3,926,445, prior techniques for coating gasket materials with liquid dispersions of polymers include coating one side of the gasket material with a very thin coating of the polymeric dispersion so that the coating material can dry readily. The thin coating technique sometimes requires several coating applications. The present invention relates to a method of applying a liquid dispersion of a polymer to a fluid-permeable core material in such a manner that the fluid-permeable core material is not substantially permeated with liquid from the applied coating. In this manner, the coating can be applied uniformly in any desired thickness while achieving rapid drying of the polymeric coating without causing coating surface defects.

SUMMARY OF THE INVENTION

In accordance with an important and surprising feature of the present invention, the step of preheating gasket material to a temperature of at least about 125° or 130° F., and preferably in the range of 150°–250° F., prior to applying a liquid dispersed polymeric coating, reduces to a total of 10–40 seconds the time required for the coated gasket to dry to a tack-free condition, as compared with the prior art time of 20–80 minutes. Additionally, the process and apparatus of the present invention completely eliminate the above-described problems of production interruptions and gasket blistering which occur with the prior art air drying/hook-hanging process. Accordingly, it is an object of the present invention to provide a method of making fluid-impermeable gaskets whereby a fluid-permeable gasket material is heated to a temperature of at least 125° F. prior to coating the gasket material with a water or other liquid dispersion of a fluid-impermeable polymeric coating.

Another object of the present invention, is to provide a method for transporting gasket materials and the like, which have a wet coating of a polymeric dispersion, through a drying station in a manner which minimizes the disturbance to the wet coating and maintains the impermeable nature of the polymeric coating.

Another object of the present invention, is to provide a method of making fluid-impermeable gaskets whereby a fluid-penetrable gasket material, before coating, is heated to a temperature sufficient to prevent any substantial penetration of liquid into the gasket material when the gasket material, at the preheated temperature, is contacted with a liquid dispersion of polymer.

Another object of the present invention is to provide a method of coating gasket materials including heating gasket material to a temperature sufficient to prevent any substantial penetration of liquid into the gasket material when contacted with a liquid dispersion of polymer and maintaining the gasket material at or above such temperature until the gasket material is dried to a tack-free condition.

Another object of the present invention is to provide a method for conveying gasket material, freshly coated with a liquid dispersed polymer, through a drying station by conveying the coated gasket while suspended on a plurality of raised portions of a non-flat conveyor so that the polymeric coating is contacted by the conveyor in only a small area (generally less than about 30% of the lower major surface area of the gasket) during drying of the coating to a tack-free condition.

Another object of the present invention is to provide a method for conveying a gasket, having a liquid dispersed polymeric coating, on a conveyor having a network of raised portions while the major surfaces of the coated gasket lie in a substantially horizontal plane so that after drying, any marks or indentations imparted to the polymeric coating by the plurality of conveying raised portions, will "heal over" during curing to provide a fluid-impermeable gasket.

Another object of the invention is to provide a method for accomplishing the above objects which is capable of handling gaskets of various sizes and shapes.

Another object of the present invention is to provide a method of coating gasket material that includes using a coated gasket conveyor means formed from a plurality of elastomeric, elongated cords or belts capable of being vibrated to minimize the disturbance of the coating during conveyance of the coated, partially wet, gasket on said conveyor.

Another object of the present invention is to provide a method for conveying gasket material, freshly coated with a liquid dispersed polymer, through a drying station by conveying the coated gasket while suspended on a plurality of spaced elastomeric cords or belts so that the polymeric coating is contacted by the elastomeric cords or belts in only a small area (generally less than about 30% of the lower major surface area of the gasket) during drying of the coating to a tack-free condition.

Another object of the present invention is to provide a method for conveying a gasket, having a liquid dispersed polymeric coating, on a conveyor having a network of spaced elastomeric cords having a generally circular cross section so that after drying, any marks or indentations imparted to the polymeric coating by the plurality of conveying elastomeric cords will "heal over" during curing to provide a fluid-impermeable gasket.

Another object of the present invention is to provide a method of coating gasket material that includes using a coated gasket conveying means formed from a plurality of spaced, generally parallel disposed elastomeric support members having a softening point at a temperature above the pre-heated temperature of the gaskets for conveying coated gaskets from a coating station to a curing station without disturbing the fluid-impermeable nature of the coating.

BRIEF DESCRIPTION OF THE DRAWINGS

FIG. 1 is a cut-away, partially broken away side view of the apparatus constructed in accordance with the principles of the present invention;

FIG. 2 is an enlarged, elevated, cut-away view of a preheating station, constructed in accordance with the principles of the present invention, taken along the line 2—2 of FIG. 1;

FIG. 3 is an enlarged, cross-sectional view of a "de-milking" or drying section constructed in accordance with the principles of the present invention, taken along the line 3—3 of FIG. 1;

FIG. 4 is an enlarged, elevated side view of a portion of the coating station of FIG. 1 showing the close proximity of conveyor belts of the preheating and drying sections to the coating nip, for the purpose of conveying and coating parts of varying size;

FIG. 5 is an enlarged, partially cut-away top view showing a gasket being carried on a wire cloth belt forming the drying section conveyor belt of the apparatus used in the present invention, taken along the line 5—5 of FIG. 3;

FIG. 6 is a fragmentary, cross-sectional view of a coated gasket being carried by the wire cloth conveyor of the drying section used in the apparatus of the present invention, taken along the line 6—6 of FIG. 5;

FIG. 7 is an enlarged fragmentary, cross-sectional view of a coated gasket being carried by the wire cloth conveyor belt of the drying section used in the apparatus of the present invention showing the wire cloth slightly penetrating the wet polymeric coating;

FIG. 8 is an enlarged fragmentary, cross-sectional view of a completed encapsulated gasket (coated on all sides and edges) manufactured in accordance with the principles of the present invention using the wire cloth conveyor belt shown in FIGS. 5-7, illustrating that any marks or indentations imparted to the coating by the conveyor belt in the drying section of the apparatus have healed over during curing;

FIG. 9 is a partially cut-away top view of another embodiment of the apparatus used in the present invention showing a gasket being carried on a dimpled angle bar forming the conveyor belt of the drying section of the present invention;

FIG. 10 is a fragmentary, cross-sectional view of a coated gasket being carried by the dimpled angle bar conveyor belt of the drying section used in the apparatus of the present invention, taken along the line 10—10 of FIG. 9;

FIG. 11 is an enlarged fragmentary, cross-sectional view of a coated gasket being carried by the dimpled angle bar conveyor belt of the drying section of the apparatus used in the present invention showing the dimples of the angle bar slightly penetrating the wet polymeric coating;

FIG. 12 is an enlarged fragmentary cross-sectional view of a completed encapsulated gasket (coated on all sides and edges), manufactured in accordance with the principles of the present invention, illustrating that any marks or indentations imparted to the coating by the angle bar conveyor belt in the drying section of the apparatus have healed over during curing;

FIG. 13 is a partially cut-away top view of another embodiment of the apparatus used in the present invention showing a gasket being carried on a conveyor belt formed by rigid strips of pointed projections (needles) located in the drying section of the apparatus;

FIG. 14 is a fragmentary, cross-sectional view of a coated gasket being carried by the needle strips shown in FIG. 13, taken along the line 14—14 of FIG. 13;

FIG. 15 is an enlarged fragmentary, cross-sectional view of a coated gasket being carried by the needle strips shown in FIGS. 13 and 14 showing the conically pointed needles of the conveyor strips slightly penetrating the wet polymeric coating;

FIG. 16 is an enlarged fragmentary cross-sectional view of a completed encapsulated gasket (coated on all sides and edges), manufactured in accordance with the principles of the present invention using the needle strips shown in FIGS. 13-15, illustrating that any marks or indentations imparted to the coating by the conveyor belt in the drying section of the apparatus have healed over during curing;

FIG. 17 is a partially cut-away top view of another embodiment of the apparatus used in the present invention showing a gasket being carried on a needle belt conveyor of the drying section of the apparatus;

FIG. 18 is a fragmentary, cross-sectional view of a coated gasket being carried by the needle belt conveyor shown in FIG. 17, taken along the line 18—18 of FIG. 17;

FIG. 19 is an enlarged fregmentary, cross-sectional view of a coated gasket being carried by the needle belt conveyor shown in FIGS. 17 and 18 showing the conically pointed needles slightly penetrating the wet plymeric coating;

FIG. 20 is an enlarged fragmentary cross-sectional view of a completed encapsulated gasket (coated on all sides and edges), manufactured in accordance with the principles of the present invention using the needle belt conveyor shown in FIGS. 17-19, illustrating that any marks or indentations imparted to the coating by the conveyor belt in the drying section of the apparatus have healed over during curing;

FIG. 21 is a schematic diagram showing a slightly modified form of the apparatus; and FIG. 22 is a schematic diagram showing the manner in which the coated and cured gaskets may be delivered to a release coating device and then conveyed by suitable means to an inspection, packaging and shipping area.

FIG. 23 is a cut away side view of the apparatus constructed in accordance with the present invention showing a continuous, elastomeric cord belt conveyor in the drying section;

FIG. 24 is an enlarged, cross-sectional view of a "de-milking" or drying section constructed in accordance with the principles of the present invention having an elastomeric cord continuous conveyor belt;

FIG. 25 is an enlarged, elevated side view of a portion of the coating station of FIG. 23 showing the close proximity of the preheating section and drying section (having a continuous elastomeric cord conveyor belt) to the coating nip;

FIG. 26 is an enlarged, partially cut away top view showing a gasket being carried on a continuous, elastomeric cord conveyor belt forming the drying section conveyor belt of the apparatus used in the present invention, taken along the line 26—26 of FIG. 24;

FIG. 27 is an enlarged fragmentary, cross-sectional view of a coated gasket being carried by the elastomeric cord conveyor belt of the drying section of the apparatus of FIG. 23 showing the elastomeric cord slightly penetrating the wet polymeric coating;

FIG. 28 is an enlarged fragmentary, cross-sectional view of a completed encapsulated gasket (coated on all sides and edges) manufactured in accordance with the principles of the present invention using the elastomeric cord conveyor belt shown in FIGS. 23-26, illustrating that any marks or indentations imparted to the coating by the conveyor belt in the drying section of the apparatus have healed over during curing.

FIG. 29 is an enlarged cross sectional view of a particular shape of a cord belt for the drying station conveyor in accordance with the present invention.

DETAILED DESCRIPTION OF THE INVENTION

In general, most gasket materials can be coated with polymeric dispersions in accordance with the present invention. Exceptions would be materials that are, for example, "waxy" or "slippery" so as to resist adhesion of the coating material to the gasket material. Examples of "waxy" or "slippery" substances are most of the TEFLON materials—or materials that have been pre-coated with certain types of anti-stick or release materials. The fluid-penetrable gasket materials may take a variety of configurations and compositions. This variety spans a very wide range—including, for example, organic and inorganic fibers such as wood, cotton, sisal, jute, asbestos, and glass, in various thicknesses, densities and incorporating various fiber preparations, for example, fine, coarse, short, long, rough, and the like. There is also a wide variety of available gasket stock materials, as, for example, those disclosed in the U.S. patents to Kao U.S. Pat. Nos. 2,676,099; 2,884,060 and 3,082,145.

For the most part, this invention is primarily applicable to the coating of finished gaskets, i.e., gaskets which, except for the application of the seal coating, and in some cases, a release coating, are complete in and of themselves. There are exceptions, of course, as when the part to be coated is purely a cover sheet for a cored gasket as shown, for example, in Farnam U.S. Pat. No. 3,796,623. Of course, the invention is not limited to layer gaskets, and may be used with many forms of laminated gaskets.

Cutting a gasket into a particular required shape creates a considerable percentage of waste gasket material since, in most cases, gaskets encircle one or more openings or holes. Wasted gasket material, for this applicant, for example, ranges from about 20 to about 80% with an average of about 50 to 70% even though small gaskets are made from cut-out or waste portions from larger gaskets whenever possible. Accordingly, it is very important in the art of gasket manufacture to provide a process whereby gaskets can be shaped or cut from relatively inexpensive gasket sheet materials and, after shaping, the gaskets can be coated with one or more polymers to provide the properties of proper sealing and gas-impermeability.

In accordance with an important feature of the present invention, the sealing capability of gasket material is improved by concentrating substantially all of the polymers necessary for surface sealing sensitivity at the gasket surfaces, where needed, by coating the gasket material with a liquid dispersion of polymer after shaping the gasket, as by die-cutting. Accordingly, the more expensive gasket sheet materials having a substantial percentage of elastomer blended with the fibers during manufacture are unnecessary by utilizing the principles of the present invention. The cost savings in using the coating method of this invention are two-fold—elastomer is not wasted throughout the body or core of the gasket material; and elastomer is not wasted in material which is cut away when the gasket is shaped. It has been recognized that coating would provide this two-fold cost savings but in the past the coating steps necessary were about as costly as the more expensive sheet materials, as above-described with reference to the prior art hook-hanging procedure. Now, for the first time, a process is described whereby substantial cost savings can be realized by utilizing less expensive gasket sheet materials in that the materials can be economically and effectively coated with one or more polymers after shaping.

Another important advantage to providing gaskets made from sheet materials having a relatively small percentage of elastomers in the core material is that such materials have better stress relaxation properties. Gaskets having a smaller percentage of elastomer in the core material have significantly increased torque retention to hold clamped flanges together and thereby maintain a better seal.

The polymeric coating used in fabricating the gaskets of the present invention may be tailored for firmness or softness and should have a high degree of fluid-resistance so that after total curing or setting up, the coating is capable of forming a substantially fluid-impermeable or impervious barrier on at least one or both major surfaces of the gasket. Particular polymers found satisfactory include those which are thermosetting at a temperature in the range of about 325° to 400° F. In a preferred embodiment of the present invention, the polymeric coating is applied to the core of gasket material as a water dispersion. Satisfactory polymers include blends of synthetic elastomers such as neoprene and nitrile rubber with synthetic resins such as phenolic resins with appropriate curing agents. Other polymeric coating materials, resins and elastomers may be used, such as those disclosed in U.S. Pat. No. 3,158,526 to Farnam et al. The particular polymers, elastomers and resins which are selected will be chosen for their respective properties, to thereby "tailor" the gasket to suit the environmental conditions of its intended use. The relative proportions of the particular polymers may be varied to accentuate any desired characteristics.

When a phenolic-resin/elastomer type polymer is used, it will be found that when the coating is cured after drying, the resin actually softens or melts materially in its combination process with the synthetic rubber to provide a fluid-impermeable coating. Depending upon the material, type of clamping flanges, finish, temperatures, fluid to be sealed, and the like, some materials under certain conditions tend to stick to the clamping flanges when they are disassembled. Broadly speaking, experience indicates that sticking may be of a "mechanical nature". For example, the gasket surface material might extrude into the pores of slightly porous clamp flange surfaces to hook or lock the gasket in place. On the other hand, gasket sticking might be chemical in nature or a combination of chemical and mechanical locking, frequently difficult to predict until after a particular material has been tried or tested. Therefore, when these types of conditions occur, release coatings are applied to the gasket material to eliminate the sticking problem and, at times, release compounds can be incorporated in the gasket material or coating material. The release coatings on the gasket material or coated gasket should have the required resistance to the total environmental conditions under which the part is to be used.

The process of the invention is adaptable to provide polymeric coating having desired thicknesses as may be necessary for ultimate end uses. Generally, the thickness of the polymeric coating applied to the surface of the article to be coated, for example a gasket, will be in the range of about 0.0005 to 0.005 inch. The preferred thickness is in the range of about 0.001 to 0.002 inch.

It is an important feature of the present invention to provide a method for applying polymeric coatings to fluid-penetrable articles in a more uniform thickness than methods of the prior art. The method of the present invention permits the gasket material to lie in a substantially horizontal plane while in the drying or "de-milking" station until the polymeric coating is substantially tack-free. The effect of gravity will, therefore, not cause the wet polymeric coating to accumulate more in any particular area of a major gasket surface, as might occur during the lengthy drying path of the above-described prior art hook-hanging method. Further, it has been found that pre-heating the gasket material prior to coating enables the fluid dispersed polymeric coatings to dry almost instaneously so that the wet polymeric coating will not have sufficient time to penetrate the gasket surface as the coated gasket is supported on the drying station conveyor belt. The capability of providing a uniform thickness of polymer on the major gasket surfaces is very important to assure adequate sealing between flange bolts, as set forth above.

Where die cut parts are coated, depending upon the particular material and thickness, the coatings generally will have a tendency to build up thicker at the cut edges than on the major surfaces of the part. This tendency is actually an advantage since the additional polymer thickness on the edges is desirable for sealing purposes. The die cutting process easily can be modified to allow for the extra coating thickness on the edges. It is important to recognize the fact that many gaskets, particularly at the cut edges, are not as uniform and smooth as, for example, sheet steel used to produce tin cans, which are frequently coated. It is therefore important to select and tailor the coatings to flow so that the coating is not too thick or viscous and at the same time maintain sufficient viscosity to provide the minimum coating thickness for an effective seal under particular conditions.

It is another important feature of the present invention to provide a method capable of coating a variety of fluid-penetrable articles having very distinct differences in size and shape. The assignee of this application presently produces several thousand different shapes and sizes of fluid-penetrable articles capable of being coated with a fluid dispersed polymer in accordance with the principles of the present invention. The method and apparatus herein described can be used to coat most, if not all, of these several thousand parts, without modification, from the smallest, to parts as wide as the conveyor belts.

Accordingly, the specific configuration of the gaskets coated in accordance with the method of the present invention may be many. Automatic transmission pan gaskets, automotive water pump gaskets, carburetor airhorn to bowl gaskets, and similar gaskets, made in accordance with the teachings of this invention, have been found to work especially well.

In accordance with a specific embodiment of the present invention, a liquid polymeric dispersion is deposited onto gasket material in a continuous layer or state to provide a completely coated gasket on both major surfaces and all edges having the desired characteristics of fluid-impermeability, conformability, and sealability tailored to meet a variety of end uses.

DETAILED DESCRIPTION OF THE PREFERRED EMBODIMENTS

Referring now to FIG. 1, there is generally illustrated apparatus for preheating and conveying a gasket part, coating the gasket with a fluid dispersed polymer, and drying and then curing the coating in accordance with the present invention. Preferably, the gasket material (i.e. FIG. 5) first is cut to its final configuration, as by die cutting, and then placed on a conveyor belt 12 for conveyance into and through a preheating station, generally designated by reference numeral 13. Preheating station 13 includes a preheating oven generally designated by reference numeral 14. The conveyor belt 12 is maintained in a predetermined path through preheating station 13 by guide rollers 15 and 15A.

It is an important feature of the present invention that the gasket material is preheated to a temperature sufficient to prevent any substantial penetration of liquid into the gasket material and maintained at or above such temperature until the gasket is coated with a water or solvent dispersion of a fluid-impermeable polymer.

It has been found that a preheating station temperature of at least 130° F. will prevent substantially all of the polymeric dispersion from penetrating into the gasket material and simultaneously force the solvent or water in the coating outwards thru the coating and dry the coating from the inside out to prevent blistering. The preheating not only speeds up the drying process, but also prevents the coating from bubbling and blistering as often occurs in coating materials when dryed only from the outside. It is important to recognize, as earlier stated, that these type coatings which are designed to become sealants rapidly are closing up on the outer surface, or "skin over" during the drying process to create a fluid blockage preventing further fluid escape from the gasket and polymeric coating.

It is understood that materials to be coated, such as gaskets, vary over a tremendous range in properties such as density, structure, thickness, porosity and other physical characteristics. Recognizing this wide variety of materials, it may be possible to use a preheating temperature as low as approximately 125° F. with some materials, coatings, and coating thicknesses, but obviously, the lower the temperature and the closer to room temperature, the greater the likelihood of blisters and the more unreliable and inconsistant the process. Temperatures in the range of 130°-150° F. can be tested easily to determine if such low temperatures will be effective in coating a particular gasket material with a particular coating in a given thickness by conveying one or two trial parts through the apparatus of the present invention with the preheating station 13 operating at various temperatures. In this manner, the lowest temperature at which the gasket will not blister can be determined. It is noted that, in many cases, a temperature of at least 135° or 150° F. is sufficient for this purpose.

Preheating oven 14 includes a plurality of radiant heaters 16 disposed immediately above and below conveyor belt 12 so that the gasket material is heated completely throughout its thickness during its passage through preheating oven 14. An exhaust fan 18 is attached to preheating oven 14 for removal of the gases formed in the oven 14. More particularly, the exhaust fan 18 removes a considerable portion, and in some cases substantially all, of the residual water content of the gasket material which the gasket material may have picked up during storage as a result of ambient humidity and/or the moisture content that exists in almost all compactible materials. In the preheating oven 14, the gasket material is heated and dryed to, in most cases, substantially bone dry condition and is heated to a temperature of at least about 130° F., preferably in the range of about 160° to 200° F. The gasket material should ordinarily not be excessively preheated to a temperature which would cause the polymeric dispersion coating to boil (bubble) when applied.

The gasket material leaves the preheating oven 14 and is directed into a coating station, designated generally by reference number 22. The coating station 22 generally comprises a pair of absorbent mop-type rollers 24 and 26 disposed such that upper roller 24 contacts lower roller 26.

In the preferred embodiment shown in FIGS. 1–8, both upper and lower mop rollers 24 and 26 receive a liquid dispersed polymeric coating to fully encapsulate the preheated gasket on all sides and edges. In this manner the finished gasket will be completely fluid-impermeable. Lower mop roller 26 receives the polymeric coating by contacting lower coating transfer roll 28 partially submersed within a lower surface coating material 30 held within reservoir 32. Upper mop roller 24 receives the polymeric coating by contacting upper coating transfer rolls 34 and 36. Transfer roll 36 is partially submersed within an upper surface coating material 38 in reservoir 39 to transfer the upper surface coating 38 to roller 34 for transfer of the coating material 38 to upper mop roller 24. The upper transfer rollers and upper mop roller are driven by drive roller 40 operatively connected to motor 42. Rotation of upper mop roller 24 drives lower mop roller 26 causing further pick-up and transfer of the lower coating material 30 from reservoir 32. The coating method may vary widely, and any of the well known coating methods are useful in accordance with the principles of the present invention to apply a coating of a liquid-dispersed polymer over the gasket. The coating materials 30 and 38 can be the same or different and can be applied in the same or different amounts to the top and bottom surfaces.

Other coating techniques, such as spraying, dipping, and the like, also can be used to apply the polymeric coatings 30 and 38 to the preheated gasket material. The coating material applied at coating station 22 is supplied in substantially equal thicknesses on the top and bottom major surfaces of the gaskets, on the outside edges of the gasket as well as the inside edges surrounding internal apertures and bolt holes. The rollers 24 and 26 preferably are mop-type rollers having deep piles, as generally known in the art of gasket coating. The gaskets are fed into the nip of the rollers 24 and 26 for coating, and a support table (not shown) can be disposed between the preheating station 13 and coating station 22 for accurate feeding of the gaskets into the nip of rollers 24 and 26. The polymeric dispersion coating can be applied by any other known method of coating sheet material. The coating can be applied as thick or as thin as desired for any particular intended use on one or both major surfaces.

In accordance with an important feature of the present invention it has been found that gaskets pre-heated to a temperature of at least about 125° or 130°–150° F. will prevent substantially all of the water or other solvents contained in the polymeric dispersion from permeating the material being coated. The heat contained in the preheated gaskets provides a substantial driving force for causing rapid migration of the water or solvent away from the gasket and through the polymeric coating. In this manner, the gasket can be dried to a tack-free condition in a period of less than about one minute, and ordinarily, in a period of time within the range of about 20–40 seconds. This result is most surprising since, in the prior art method of hook-hanging gaskets for air drying, it has required 20–80 minutes, or in some cases, even twice that long, for sufficient water or solvent removal before the polymeric coating could be cured without gasket blistering. The preheating temperature should be sufficient to vaporize the solvent or dispersant (carrier) in the subsequently applied polymeric coating composition. Accordingly, preheating is generally sufficient in the range of 130°–250° F.

In accordance with another important feature of the present invention, the preheated gasket material, coated in accordance with the present invention is conveyed from coating station 22 immediately to a drying or "de-milking" station designated generally by reference numeral 44. In some circumstances, however, this drying station may not be necessary. At drying station 44, the gasket material dries from the inside out to a tack-free condition as a result of being preheated while supported on a conveyor designed so that there is minimal disturbance of the impermeable quality of the polymeric coating on the surface contacting the conveyor. The drying or "de-milking" station 44 (best shown in FIG. 3) includes a wire mesh conveyor designated generally by reference numeral 46.

Wire mesh conveyor 46 includes a conveyor belt 48 comprising a reticulated wire mesh, as best shown in FIGS. 5–7, having a plurality of spaced apart raised portions 50, for supporting the coated gasket material. The particular wire mesh 50 illustrated in FIGS. 5–7 is a galvanized balanced weave belt made by Ashworth Corporation, has a weight of 1.5 pounds per square foot, has a wire diameter of 0.062 inch, has openings of approximately 0.27 inch × 0.31 inch, and has a cross-sectional wire area of 0.221 inch per foot of belt width. The conveyor belt 48 is maintained in a predetermined path within drying station 34 by guide rollers 52 and 52A. As best shown in FIG. 5, the wire belt 48 comprises a plurality of generally horizontally disposed, generally parallel, spaced cylindrical wires 54, having bends 56 alternating in opposite directions at regular intervals, and a plurality of angled cross woven wires 58 contacting the wires 54 at bends 56 to form approximately 90° angles between wires 54 and wires 58, tying together two adjacent generally horizontal wires 54. The wire belt 48 is capable of fully supporting a gasket in a horizontal position throughout the length of the drying station 44. The wire belt is capable of supporting articles having any desired shape or configuration in a substantially horizontal position without permanent damage to the applied polymeric coating and without the necessity for non-functional holes for hook-hanging the article. The uppermost portions 50 of cross weave wires 58 of belt 48 may impart temporary holes or depressions to the applied coating, but in the curing station the polymer surrounding the depressions is fused together to "heal-over" the coating. The preheating of the gasket 60 (FIG. 5) in preheating station 13 minimizes the temporary damage because of the surprising and almost instantaneous drying which occurs in drying station 44 as a result of the preheating.

As best shown in FIG. 4, the preheating station conveyor belt 12 and the drying station conveyor belt 48 are disposed as close as possible to coating rollers 24 and 26 to assure that small gasket parts are received between the rollers 24 and 26 and delivered to the drying station conveyor belt 48. The guide roller 15A at the coating station end of preheating station belt 12 and the guide roller 52A at the coating station end of drying station belt 48 are of small diameter, for example 1¼ inch, for conveyor belts having a 36 inch width to minimize the distance between the coating roller nip and the two adjacent conveyor belts 12 and 48.

The drying station 44 is enclosed above the conveyor belt 48 by an exhaust hood 62 including flexible walls 64 attached to the ends and sides of the exhaust hood 62 for enclosing the drying station above and below conveyor belt 48. The drying station 44 also includes an exhaust fan 66. The exhaust fan 66, in fluid communication with the enclosed portion of drying station 44, removes the gases formed in drying station 44 and particularly removes the water or solvents from the polymeric coating, so that the gaskets are in a tack-free condition when exiting drying station 44. Drying station 44 also includes a polymer collection reservoir 68, located under guide rollers 52 for catching polymeric coating drippings from conveyor belt 48. A second polymer collection reservoir 70 is disposed directly under the conveyor belt 48 to catch additional wet polymer drippings through belt 48.

The coated, tack-free gaskets are conveyed from drying station 44 by a conveyor belt 72 through a curing station designated generally by reference numeral 74. Curing station 74 includes an oven, designated generally by reference numeral 76, having a plurality of spaced radiant heaters 78 both above and below the conveyor belt 72 for curing the polymeric coating on all sides of the gasket material. Conveyor belt 72 is maintained in a predetermined path within curing station 74 by guide rollers 79. The gasket material 60 is heated in oven 76 to a temperature sufficient to cure the particular polymeric coating applied to the gasket. The curing oven 76 includes an exhaust fan 80 in fluid communication therewith for removal of gases formed within the oven 76.

The preheating oven 14 and the curing oven 76 are each constructed substantially alike. As best shown in FIG. 2, the preheating oven 14 includes insulated outer walls 82, 84, 86 and 88. Vertical frame members 90 and 92 are attached to the outer side walls 86 and 88 and serve to secure radiant heater support members 94 and 96 and a plurality of spaced conveyor belt support members 98, in position within the preheating oven 14. The completed gasket is moved from the curing station from conveyor 72 for storage and packaging. It should be noted that radiant heating is feasible with conveyor belt support for the gaskets, whereas in the prior art vertical support method ambient air heat was required.

As shown in FIGS. 5–8, a die-cut gasket 60 is suspended or supported horizontally on the wire belt 48 of the drying station 44, regardless of the amount of open gasket area. The upper and lower mop rollers 24 and 26 of coating station 22 fully encapsulate the gasket 60 with a polymeric coating 100 on all sides and edges as shown in FIGS. 7 and 8. Any depressions formed in the polymeric coating 100 on the undersurface of the gasket (FIG. 7) when carried through the drying station, are fused together or "healed over" in the curing oven 76, as shown in FIG. 8.

In accordance with another embodiment of the present invention, as shown in FIGS. 9–12, a different conveyor belt referred to generally by reference numeral 102 is substituted for the conveyor belt 48 in drying station 44 to support a coated gasket, such as gasket 104. This conveyor belt 102 generally comprises a plurality of dimpled angle bars 106 disposed generally parallel to one another extending longitudinally across the width of the drying station 44. The dimpled angle bars 106 generally comprise rigid support members having relatively small sheet support areas, compared to the small dimensions of the bars 106. The relatively small support area is formed by providing a central peak or apex 108 disposed longitudinally across each bar along its central axis. Spaced dimples 110 are then formed in each angle bar 106 along the longitudinal peaks 108 to provide support for the gaskets 104 as they are conveyed through the drying station 44. The included angle $\alpha$ (FIG. 10) between the legs 112 and 114 and the spacing of dimples 110 of angle bars 106 can be made as small as necessary to assure proper support for small gasket parts.

The dimpled angled bars 106 include flattened ends 115 as shown in FIG. 9 and are fastened by suitable fasteners 116 to tabs 117 attached to suitable conveyor rollers 118 hingedly connected by roller linkages 120 and fastening means 121 for travel around the guide rollers 52 and 52A. The dimples 110 can be formed by molding or expanding the angle bars 106 at appropriate locations along the apex 108. As with conveyor 48 illustrated in FIGS. 4–6 the conveyor belt 102 is flexible enough to revolve around the relatively small diameter guide roll 52A to maintain conveyor belt 102 in close proximity to the nip of coating rollers 24 and 26. The dimpled angle bar conveyor belt 102 provides horizontal support for the gaskets, such as gasket 104, regardless of the amount of open gasket area. The conveyor belt 102 has a sufficiently small contact area with gasket 104 so that any depressions formed in the polymeric coating 122 of gasket 104 (FIG. 11) during conveyance through the drying station 44 are fused together or "healed over" in the curing station 74, as shown in the completed gasket of FIG. 12.

In accordance with another embodiment of the present invention, as shown in FIGS. 13–16, another conveyor belt referred to generally by reference numeral 124 can be used in the drying station 44 for conveyance of gaskets, such as gasket 123. This conveyor belt 124 generally comprises a plurality of generally flat rigid strips or bars 126 having spaced needle point projections 128 press fitted into drilled holes in the strips 126. The needle point projections 128 have conically tapered pointed ends 130 lying in the same generally horizontal plane throughout the length of the drying station 44. The strips can be made of any suitable rigid material such as laminated sheets of phenol-formaldehyde or melamine formaldehyde impregnated paper sheets (i.e.

FORMICA). As a specific example, the pointed projections or needles 128 comprise cylindrical pins having tapered points 130 at their uppermost extremities for contacting the gasket material on a minimum of support area. In a specific example, the needles 128 are about one half inch long, about 0.075 inch at their widest diameter, and are spaced ⅜ inch center to center. A plurality of needle conveyor belts like 124 having various needle spacings, sizes and heights can be provided to accomodate specific part sizes and coatings. The ends of the rigid strips or bars 126 are fastened by suitable fasteners 132 to tabs 133 attached to suitable conveyor rollers 134 which are hingedly connected by roller linkages 136 and fastening means 139 for travel around the guide rollers 52 and 52A. The conveyor belt 124 is flexible enough to revolve around the relatively small diameter guide roll 52A to maintain conveyor belt 124 in close proximity to the nip of coating rollers 24 and 26. The needle conveyor belt 124 provides horizontal support for the gaskets, such as gasket 123, regardless of the amount of open gasket area. The tapered points 130 extend into the polymeric coating 140 of the bottom surface of gasket 123, as shown in FIG. 15, but any marks or indentations in the bottom surface coating disappear in the curing station 74 where the polymer surrounding the indentations fuse together or "heal over" as shown in the completed gasket of FIG. 16.

In accordance with another embodiment of the present invention, as illustrated in FIGS. 17-20, another conveyor belt, referred to generally by reference numeral 138 can be used in the drying station 44 for conveyance of gaskets, such as gasket 149. The conveyor belt 138 includes a plurality of apertures 140 disposed between adjacent rows of pointed projections 141. The apertures allow for homogeneous gas and temperature distribution throughout the enclosed portion of drying station 44 and permit wet polymer to drip through the conveyor belt 138 to avoid a build-up of polymer.

As a specific example, needles 141 comprise cylindrical stainless steel pins secured to the conveyor belt 138 by an under-belt rivet 142 and an above-belt nut 144. The conveyor belt 138 is maintained in a predetermined path within drying station 44 by guide rollers 52 and 52A. Guide discs (not shown) can be disposed between adjacent rows of needles 141 to aid in guiding the conveyor belt 138 along its predetermined path. The uppermost extremity of each needle 141 includes a conically tapered point 147 for contacting the gasket material on a minimum of support area. In a specific embodiment, the needles are about ½ inch long and about 0.075 inch in diameter; the needles are spaced ⅜ inch center to center and are capable of fully supporting a gasket in a horizontal position throughout the length of the drying station 44. A plurality of conveyor belts 138 having various needle spacings, sizes and heights can be provided to accomodate specific part sizes and coatings.

The needles of the needle conveyor are capable of supporting articles having any desired shape or configuration in a substantially horizontal position without permanent damage to the applied polymeric coating and without the necessity of non-functional holes for hook-hanging the article. A die-cut gasket 149 is supported horizontally on the pointed projections 141, regardless of the amount of open gasket area. The conically shaped points 147 of needles 141 penetrate the applied polymeric coating layer 150, while the coated gasket is conveyed through drying station 44, as shown in FIG. 19, leaving pin holes in one major surface of the coated gasket as it enters the curing station 74. The curing oven 76 causes the pin holes to "heal over" during curing of the polymeric coating 150 (as shown in FIG. 20) to maintain the fluid-impermeability of the gasket 149.

In accordance with another important embodiment of the present invention, as shown in FIGS. 23-28, the preheated gasket material, coated in accordance with the present invention is conveyed from coating station 22 immediately to a drying or "de-milking" station designated generally by reference numeral 44A having an elastomeric cord conveyor belt, generally designated by reference numeral 300. At drying station 44A the gasket material dries from the inside out to a tack-free condition as a result of being preheated, while supported on the elastomeric cord conveyor designed so that there is minimal disturbance of the impermeable quality of the polymeric coating on the surface contacting the conveyor.

The drying or "de-milking" station 44A (best shown in FIG. 24) includes a plurality of spaced, generally parallel elastomeric cords 302, revolving continuously around grooved guide rollers 304 and 306 as best shown in FIGS. 24 and 26, having a plurality of spaced apart elastomeric cords 302 for supporting the coated gasket material. The particular elastomeric cords 302 illustrated in FIGS. 23-27 are elongated polyurethane cords having a circular cross-section about 3/16 inch in diameter, purchased in continuous spools and heat fused at the ends to provide a plurality of continuous parallel cord belts 302 spaced about ½ inch apart. Polyurethane cord conveyor belting is known, as shown in Eagle Belting Company Catalog No. 578 10M. Copyright 1977, 1683 S. Mt. Prospect Rd., Des Plaines, Ill. 60018.

The conveyor belt 300 is maintained in a predetermined path within drying station 44A by grooved guide rollers 304 and 306. The elastomeric cords 302 are maintained in a predetermined spacing by providing grooves 308 in guide rollers 304 and 306. The elastomeric cords 302 are maintained in a predetermined spacing by providing grooves 308 in guide rollers 304 and 306. The cords 302 are disposed within the grooves 308 to maintain the cords 302 substantially parallel and substantially evenly spaced. As best shown in FIG. 26, the conveyor belt 300 comprises a plurality of generally horizontally disposed, generally parallel, spaced elastomeric cords 302. To transport the coated gaskets through the drying station with a minimum of disturbance for the coating, it has been found that by vibrating the elastomeric cords 302, the cords 302 do not deeply penetrate the polymeric coating. Further, vibration of the cords 302 aids in preventing a build up of polymeric coating on the cords 302 of the conveyor belt 300 so that the conveyor requires infrequent cleaning. The cords 302 naturally vibrate by virtue of the fact that they have moving, elongated portions relatively unsupported thereunder, but additional vibration can be supplied in any known manner. The vibration can be accomplished by providing eccentric-grooved guide rollers (not shown) in place of the guide rollers 304 and 306 (FIG. 1) or by providing guide rollers 304 and 306 with spaced bumps or protrusions (not shown) along a line of contact of the cords 302 with the guide rollers 304 and 306. Another method of vibrating cords 302 would be to provide a vibrating means on one or more transverse cord-support members (not shown) disposed directly below and in contact with the travelling cords 302 between guide rollers 304 and 306. The guide rollers 304 and 306 also can be vibrated to vibrate cords 302.

To achieve the full advantage of the present invention, the elastomeric cords 302 should be made of an elastomer, which is non-adherent to the polymeric gasket coating material. It has been found that flexible polyurethane cords 302 function exceptionally well, characterized by exceptionally good surface lubricity so that the common wet, thermosetting gasket coating materials, such as the blends of neoprene and nitrile rubber with synthetic resins, such as phenolic resins, and the other coating materials disclosed in U.S. Pat. No. 3,158,526, do not stick to the surface of cords 302. Other useful polymers for forming cords 302 having softening temperatures above the pre-heated gasket temperature include, but are not limited to the polyesters, polyolefins, polyvinylchloride; regular and block copolymers of styrene with butadiene; regular and block copolymers of styrene with isoprene; polybutadiene; ethylene-propylene copolymers; polyethylene; polypropylene; styrene-polyethylene copolymers; styrene-polypropylene copolymers; acrylonitrile-butadiene copolymers; polybutadiene; chlorinated polyethylene; polychloroprene; polyepichlorohydrin; polyfluorocarbons, such as polytetrafluoroethylene; isobutylene-isoprene copolymers; silicone polymers; polyvinylnitrile; and polyvinylacetate-ethylene copolymers. The elastomeric conveyor belt 300 is capable of fully supporting a gasket 310 in a horizontal position, as shown in FIG. 26, throughout the length of the drying station 44A. The spaced elastomeric cords 302 are capable of supporting articles having any desired shape or configuration in a substantially horizontal position without permanent damage to the applied polymeric coating and without the necessity for non-functional holes for hook-hanging the article. The uppermost portions of the elastomeric cords 302 of conveyor belt 300 may impart temporary depressions to the applied coating, as shown in FIG. 27, but in the curing station 74, the polymer surrounding the depressions is fused together to "heal-over" the coating, as shown in FIG. 28. The preheating of the gasket 310 in preheating station 13 minimizes the temporary damage because of the surprising and almost instantaneous drying which occurs in drying station 44A as a result of the preheating.

As best shown in FIG. 25, the preheating station conveyor belt 12 and the drying station conveyor belt 300 are disposed as close as possible to coating rollers 24 and 26 to assure that small gasket parts are received between the rollers 24 and 26 and delivered to the drying station conveyor belt 300. The guide roller 15A at the coating station end of preheating station belt 12 and the guide roller 304 at the coating station end of drying station belt 300 are of small diameter, for example 1¼ inch, for conveyor belts having a 36 inch width to minimize the distance between the coating rollers nip and the two adjacent conveyor belts 12 and 300.

The drying station 44A includes a wash station, generally designated 312 having conveyor guide rollers 313 and 314 at least partially disposed within a solvent wash basin 314 for cleaning each of the cords 302. It has been found that the waxy surface of the spaced cords 302 do not collect much of the resin coating so that drying station conveyor cleaning does not present a significant problem when the drying station conveyor 300 is made from elastomeric cords, as described.

The elastomeric cords 302 can be manufactured in a number of cross sectional shapes. One particularly advantageous cross sectional shape is shown in FIG. 29 and generally designated as elastomeric cord 302A. Cord 302A has a cross sectional shape generally comprising a pair of trapazoids 320 and 322 having their lower, larger bases 324 and 326, respectively, interconnected by a shorter third trapazoid 328 inverted such that the third trapazoid has its shorter, lower base 330 aligned with the larger, lower bases 324 and 326 of the two interconnected trapazoids 320 and 322 to form a flat guide roller contacting surface generally designated as 332. The two larger, interconnected trapazoids 320 and 322 include tits or protrusions 334 and 336 on their upper, shorter bases 338 and 340 for gasket support over a relatively small area. A plurality of such cords 302A can be aligned to evenly space the protrusions 334 and 336 to support any desired size of gasket. The chord 302A is generally extruded as an integral cord and can be provided with one side extending inverted trapazoidal leg (not shown) shaped the same as central trapazoid 328, to space an adjacent cord 302A therefrom.

VARIOUS MODIFICATIONS AND SUMMARY OF OPERATION

Referring to FIGS. 21 and 22 which illustrate diagrammatically the sequence of operations previously described and the apparatus for performing these operations (but with some modifications thereof), it will be seen that gaskets of various materials, thicknesses, shapes and sizes are placed on a charging conveyor 12 which may be of the type shown in FIG. 5 and are delivered to a pre-heat oven 200 having radiant heaters 201 and 202 above and below the conveyor belt for pre-heating the gaskets supported on the belt to a temperature normally between 130° and 250° F. The conveyor speed is adjustable and is normally between 40 to 60 linear feet per minute with a typical average of, say, 45 linear feet per minute. The pre-heat oven 200 is of such length as to permit the gasket parts to reach the desirable pre-heat temperatures when at the discharge end of the pre-heat oven. A temperature of about 160°-200° F. might be deemed optimum.

As will be seen in FIGS. 1 and 23, the charging conveyor 12 runs at an incline to the pre-heat oven 14 so as to allow working room underneath the pre-heat oven and the other equipment which follows in sequence. The charging conveyor 12 is so designed that it can be extended, raised or lowered for the handling of various shapes, sizes, thicknesses and types of materials.

Referring again to FIG. 21, at the discharge end of the pre-heat oven, the pre-heated gasket parts are delivered to a short transfer conveyor 203, which may have heat applied as required to help the pre-heated gaskets retain their heat, and as an aid in delivering the gaskets from the charging conveyor 12 to the feeder conveyor 203, an auxiliary vacuum type feeder 204 may be used which consists of a porous fabric belt which has suction applied to it by a vacuum box 205 in a manner well known in the art for effecting transfers between adjacent belt conveyors.

Inasmuch as the equipment of this invention is designed to handle a multitude of sizes, shapes and thicknesses of gaskets, there will be some gaskets which may be very thin and flexible, and it is this type that has need of the auxiliary belt 204 and vacuum box 205 for insuring that the lead edge of the die cut part will pass properly onto the transfer conveyor 203. For stiffer, more rigid gasket structures, the belt 204 and vacuum box 205 may not be needed. The gasket parts after being received on the transfer conveyor 203 are fed into the nip of the "mop" rollers generally designated 206, which are fed from upper and lower coater reservoirs 207 and 208 respectively, and here the parts receive the polymeric and resin coating as previuously described.

When the gasket parts reach the coating rollers 206, they are at or near the pre-heat temperature, and, of course, are almost, if not entirely dehydrated. The contained heat in the gasket causes almost instantaneous vaporization of the liquid carrier for the coating material as the part passes through the coating rolls with the result that there is substantially no penetration of the liquid into the part and there is a drying of the coating material from the inside out which is highly desirable because in this way bubbling or ballooning of the coating is avoided.

It has been found in practice that with automobile pan gaskets, for example, the leading edge of the gasket is substantially tack-free even before the trailing edge of the pan gasket has left the coating rolls, which illustrates the typical action which takes place.

Although in some instances a separate drying section, such as indicated at 209, may not be necessary before allowing the part to go into the curing oven, generally designated 210, it is nevertheless desirable to provide such a drying section 209 in order to accommodate specific gasket materials, shapes and sizes which do require some additional drying to have the part achieve a tack-free condition before going into the curing oven 210. It is also desirable as a practical matter to have a drying section such as indicated at 209 in order to provide an intermediate inspection station for the coated part before effecting the cure. The drying section, when provided, includes a conveyor belt 211 which is separately adjustable as to speed and which is adjusted to a speed equal to or greater than that of the charging conveyor so as to bring the coated gasket to the curing oven at exactly the right state of pre-cure drying so that when the part enters into the curing oven, the coating will cure in a smooth and uniform manner. In some cases, this may not require that the coated part be tack-free before entering the curing oven.

The drying section 209 has an adjustable hood 212 over it which may be moved up and down as needed to permit inspection and to provide for the best drying action.

An exhaust fan is diagrammatically indicated at 213.

The drying section conveyor 211 has a wash station generally designated 214 with a scrubber 215 for keeping the belt clean.

A vacuum belt 216 with vacuum box 217 similar in all respects to the belt 204 and vacuum box 205 is provided between the drying section conveyor 211 and the discharge conveyor 218 which moves the parts through the curing oven 210 to a turn-around roll 219 (FIG. 22) located at ground level. The vacuum belt units 216 and 204 are desirably adjustable to and from operable position.

The curing oven 210 has infra-red heaters 220 above and below the belt 218 which also may be of the type shown in FIG. 5 so that heat from both upper and lower radiant heaters can readily reach the polymeric coating for curing.

The discharge conveyor 218, like the charging conveyor 12, is separately adjustable as to speed although its speed is normally equal to or greater than that of the charging conveyor so as to prevent pile-up of parts.

As the gaskets with their cured coating travel downwardly along the discharge conveyor 218 to the turn-around roll 219, they are assisted in making the turn around the latter roll by means of a cord conveyor belt, generally designated 221, comprising, by way of example, a plurality of 3/16" diameter, high tensile, temperature resistant, parallel cords spaced apart approximately ½" and extending across the width of the discharge conveyor 218. This cord conveyor belt 221, which is diagrammatically shown, insures that the coated gaskets which have now been cured make the turn around the roll 219 and will now travel along the section 222 of the conveyor 221. The cord conveyor belt 221 can be constructed in the same manner and of the same materials described with references to conveyor belt 44A of FIGS. 23–28.

From this point the gaskets may either proceed directly to a conveyor 223, taking the parts to an inspection and boxing area, or to a release coating unit, generally designated 224, may be rolled into place between the conveyor 221 and the conveyor 223 for applying a suitable release coating. The release coating unit 224 may be of any conventional form and is capable of providing a release coating to both sides of each gasket, with the release coating being compatible with the type of coating applied by the mop rolls 206. The types of polymer materials used as the release coating should have the requisite resistance to heat, chemicals, and solvents in accordance with the environment in which the gaskets are to be used and whether they will be subjected to elevated temperatures. Particular polymers, elastomers and resins selected will be chosen for their respective properties suitable to the environmental condition of particular applications, and relative proportions will be varied as dictated by conditions. All this is well-known in the art.

It will be understood that in the apparatus just described there is a wide range of adjustability to suit varying conditions. Not only are the various conveyors adjustable as to speed, but also there are many ways in which temperature control may be achieved at various stages of the process to suit particular conditions. For example, the spacing of the radiant heaters in the pre-heat oven 200 and those in the curing oven 210 with respect to associated conveyor belts may be varied as well as the input to these radiant heaters. Also the transfer conveyor 203 may have heat applied to it in order to deliver the pre-heated gasket material to the coating rollers 203 at the desired pre-heat temperature.

It has also been found that when the drying section 209 is used, it is more advantageous to have the fan 213 circulate room air very lightly over the coated gaskets rather than heated air since in the latter case the heated air appears to form a film over the coating so that when the coated gaskets reach the curing oven and receive the first shock of the high intensity heat required for curing, the gaskets are unable to "breathe" and thereby tend to entrap air and other gaseous material beneath the coating, resulting in bubbling and unevenness of the coating. However, the drying section may often be dispensed with due to the retained heat in the coated gasket.

A matter of great significance is the fact that when the coated gaskets are introduced into a curing oven of the type herein described wherein radiant heaters may be effectively used above and below the gaskets to effect a cure of the polymer coating, the curing time may be reduced to as little as a minute and a half as opposed to the fifteen or eighteen minutes required for curing when gaskets were produced by the prior art dip coating method and then hung up to dry and be cured.

While there has been illustrated and described various embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. A method of coating a liquid-penetrable material with a liquid dispersion of a polymer, comprising:
    preheating said liquid-penetrable material to a temperature sufficient to prevent any substantial penetration of liquid into said material when said material, at said preheated temperature, is contacted with a liquid dispersion of a polymer;
    coating a major surface of said preheated material while at said temperature with a liquid dispersion of a curable polymer;
    supporting the coated, liquid-penetrable material on a plurality of elastomeric elongated support members while said coating is dried to a substantially tack-free condition; and
    curing said coating to form a polymer-coated article.

2. A method as defined in claim 1 wherein said liquid-penetrable material is gasket material.

3. A method as defined in claim 1 wherein said liquid dispersion of a polymer is a water dispersion of a polymer and wherein said water penetrable material is preheated to and maintained at a temperature of at least 125° F. prior to coating.

4. A method as defined in claim 1 wherein said liquid-penetrable material is preheated to and maintained at a temperature between about 125° F. and 250° F. prior to coating.

5. A method as defined in claim 1 wherein said liquid-penetrable material is preheated to and maintained at a temperature of at least 150° F. prior to coating.

6. A method as defined in claim 1 wherein said elastomeric support members comprise a plurality of spaced polyurethane cords.

7. A method of coating a liquid-penetrable material with a liquid dispersion of a polymer, comprising:
    preheating said liquid-penetrable material to a temperature sufficient to prevent any substantial penetration of liquid into said material when said material, at said preheated temperature, is contacted with a liquid dispersion of a polymer;
    maintaining said preheated material at a temperature sufficient to prevent any substantial penetration of liquid into said material when said material is contacted with a liquid dispersion of a polymer, until immediately prior to coating said material with a liquid dispersion of a polymer;
    coating said preheated material with a liquid dispersion of a curable polymer in an amount sufficient to form a fluid impermeable barrier over said material after curing said coating;
    supporting said coated material on a plurality of gasket suspension members through a drying station said suspension members having a material contact area sufficiently small that any depressions made in the polymer coating are healed over during curing;
    drying said coated material at said drying station in an amount sufficient to provide a tack-free polymer coating on said material; and
    curing said polymer coating.

8. A method as defined in claim 7 wherein said gasket suspension members in said drying station comprise elastomeric cords.

9. A method as defined in claim 8 wherein said elastomeric cords are polyurethane cords.

10. A method as defined in claim 7 wherein said liquid-penetrable material is gasket material.

11. A method as defined in claim 7 wherein said liquid dispersion of a polymer is a water dispersion of a polymer and wherein said water penetrable material is preheated to and maintained at a temperature of at least 135° F. prior to coating.

12. A method of coating a liquid-penetrable material with a liquid dispersion of a polymer, comprising:
    preheating said liquid-penetrable material to a temperature sufficient to prevent any substantial penetration of liquid into said material when said material, at said preheated temperature, is contacted with a liquid dispersion of a polymer;
    coating a major surface said preheated material while at said temperature with a liquid dispersion of a curable polymer;
    supporting the coated, liquid-penetrable material on a plurality of support members while said coating is dried to a substantially tack-free condition; and
    curing said coating to form a polymer-coated article.

13. A method as defined in claim 12 wherein said liquid-penetrable material is gasket material.

14. A method as defined in claim 12 wherein said liquid dispersion of a polymer is a water dispersion of a polymer and wherein said water penetrable material is preheated to and maintained at a temperature of at least 125° F. prior to coating.

15. A method as defined in claim 12 wherein said liquid-penetrable material is preheated to and maintained at a temperature between about 125° F. and 250° F. prior to coating.

16. A method as defined in claim 12 wherein said liquid-penetrable material is preheated to and maintained at a temperature of at least 150° F. prior to coating.

17. A method as defined in claim 12 wherein said support members comprise a plurality of spaced polyurethane cords.

18. A method of coating a liquid-penetrable material with a liquid dispersion of a polymer, comprising:
    preheating said liquid-penetrable material to a temperature sufficient to prevent any substantial penetration of liquid into said material when said material, at said preheated temperature, is contacted with a liquid dispersion of a polymer;
    maintaining said preheated material at a temperature sufficient to prevent any substantial penetration of liquid into said material when said material is contacted with a liquid dispersion of a polymer, until immediately prior to coating said material with a liquid dispersion of a polymer;
    coating a major surface of said preheated material with a liquid dispersion of a curable polymer in an amount sufficient to form a fluid impermeable barrier over said material after curing said coating;
    supporting said coated material on a plurality of suspension members through a drying station said suspension members having a material contact area sufficiently small that any depressions made in the polymer coating are healed over during curing;

drying said coated material at said drying station in an amount sufficient to provide a tack-free polymer coating on said material; and curing said polymer coating.

19. A method as defined in claim 18 wherein said gasket suspension members in said drying station comprise elastomeric cords.

20. A method as defined in claim 19 wherein said elastomeric cords are polyurethane cords.

21. A method as defined in claim 18 wherein said liquid-penetrable material is gasket material.

22. A method as defined in claim 18 wherein said liquid dispersion of a polymer is a water dispersion of a polymer and wherein said water penetrable material is preheated to and maintained at a temperature of at least 135° F. prior to coating.

23. A method of coating a water-penetrable gasket material of the type comprising particulate material bound by an elastomer with a water dispersion of a polymer comprising:

pre-heating said water-penetrable material to a temperature sufficient to prevent any substantial penetration of water into said material when said material, at said pre-heated temperature, is contacted with a water dispersion of a polymer;

contacting a major surface of said pre-heated material while at said temperature with a water dispersion of a curable polymer;

conveying said polymer contacted material to a drying station immediately after said polymer contact to prevent prolonged contact with said water so that said water does not substantially penetrable said pre-heated material;

drying said coating; and curing said coating to form a polymer-coated article.

24. A method as defined in claim 23 wherein said water-penetrable material is preheated to and maintained at a temperature of at least 125° F. prior to coating.

25. A method as defined in claim 23 further including supporting said water-penetrable material, after coating with said water dispersion, on raised support members contacting only one major surface of said coated material to convey the water dispersion coated material through a drying station such that said raised support members contact 30% or less of one major surface of said water-penetrable material while supporting said water-penetrable material substantially horizontally through said drying station.

26. A method of coating a water-penetrable gasket material of the type comprising particulate material bound by an elastomer with a water dispersion of a polymer, comprising:

preheating said water-penetrable material to a temperature sufficient to prevent any substantial penetration of water into said material when said material, at said preheated temperature, is contacted with a water dispersion of a polymer;

maintaining said preheated material at a temperature sufficient to prevent any substantial penetration of water into said material when said material is contacted with a water dispersion of a polymer, until immediately prior to coating said material with a water dispersion of a polymer;

contacting a major surface of said preheated material with a water dispersion of a curable polymer in an amount sufficient to form a fluid impermeable barrier coating over said material after curing said coating;

conveying said coated material to a drying station immediately after contacting said material with said water dispersed polymer so that the water portion of the water dispersed polymer does not substantially penetrate the preheated material and to permit the water to be driven away from said preheated material as a result of the preheating;

supporting said coated material on a plurality of raised gasket suspension members through the drying station in an amount sufficient to provide a tack-free polymer coating on said material, said suspension members having a material contact area sufficiently small that any depressions made in the polymer coating are healed over during curing; and curing said polymer coating.

27. A method as defined in claim 26 wherein said water-penetrable material is preheated to and maintained at a temperature of at least 135° F. prior to coating.

28. A method of coating a relatively flat, water penetrable gasket member composed of fibers and/or particulate, bound together by elastomer, said method comprising conveying said member flat-wise and successively through a pre-heating station, a coating station, a drying station, and a curing station, coating the member at the coating station with a water suspension of a curable polymer, applying at least 130° F. preheat to the member as it is conveyed through the preheat station to prevent any substantial penetration of water into said preheated gasket member when said gasket member is contacted with a water suspension of a polymer, circulating air rapidly over the member as it leaves the coating station and while in the drying station to effectively dry the applied coating, controlling the amount of heat applied to the member in the pre-heat station and the speed at which the member is moved through the four stations so that the member when it reaches the coating station is not hot enough to cause curdling or coagulation of the coating material and so that the member after passing through the drying station and entering into the curing station does not blister, and then curing the coating.

29. The method as set forth in claim 28 in which the water suspension of the polymer comprises an emulsified reactive resin modified with synthetic elastomer latex.

30. The method as set forth in claim 28 in which the amount of pre-heat applied to the member in the pre-heat station is in the range between 130° F. and 250° F. and is sufficient to produce residual heat within the member as it passes through the coating station to prevent substantial penetration of the water in the polymer suspension into the gasket member, and to cause the polymer to be deposited on the surface of the gasket member as much of the water of the suspension is substantially instantaneously evaporated by the residual heat in gasket member.

31. A method as defined in claim 28 further including supporting said liguid-penetrable material, after coating with said liquid suspension, on raised support members contacting only one major surface of said coated material to convey the liquid suspension coated material through a drying station such that said raised support members contact 30% or less of one major surface of said liquid-penetrable material while supporting said liquid-penetrable material substantially horizontally through said drying station.

32. A method as defined in claim 28 including drying said liquid suspended coating for less than two minutes prior to curing said coating.

33. A method as defined in claim 32 wherein said coating is dried for one minute or less prior to curing said coating.

34. A method as defined in claim 31 wherein said raised support members include a plurality of rigid support members comprising two legs having an included angle therebetween of less than 180°, said two legs joining to form an elongated apex lying in a substantially horizontal plane when traveling through said drying station said apex including thereon a plurality of liquid-penetrable material support members.

35. A method of fabricating gaskets and the like which comprises the steps of die cutting liquid penetrable compactible elastomeric material to a desired shape;

heating said die cut material to a temperature of about 130° to 250° F. to substantially dehydrate the material;

coating said material while at said temperature with a curable polymer dissolved or dispersed in a liquid which vaporizes within said 130° to 250° F. range, whereby the liquid is unable to substantially penetrate the material and the material is left with the polymer coating; and curing the coating.

36. A method of coating a relatively flat, water penetrable, gasket member composed of fibers and/or particulate, bound together by an elastomer, said method comprising conveying said member flatwise to a coating station; heating said member prior to reaching the coating station and applying a coating to at least one side thereof, with the coating comprising a water suspension of a curable polymer, whereby the residual heat in said member as it passes through the coating station prevents substantial penetration of the water in the polymer suspension into the gasket member, and causes the polymer to be deposited on the surface of the gasket member as much of the water in the suspension is substantially instantaneously evaporated; and thereafter curing the coating.

37. A method as defined in claim 36 wherein the coating is simultaneously applied to both sides of the gasket member as it passes through the coating station.

38. A method as defined in claim 36 wherein the gasket member after coating is subjected to a further drying step after said substantially instantaneous evaporation and before curing.

* * * * *